April 16, 1946.   T. S. GERSPACHER   2,398,371
WINDOW GLASS
Filed Jan. 26, 1944
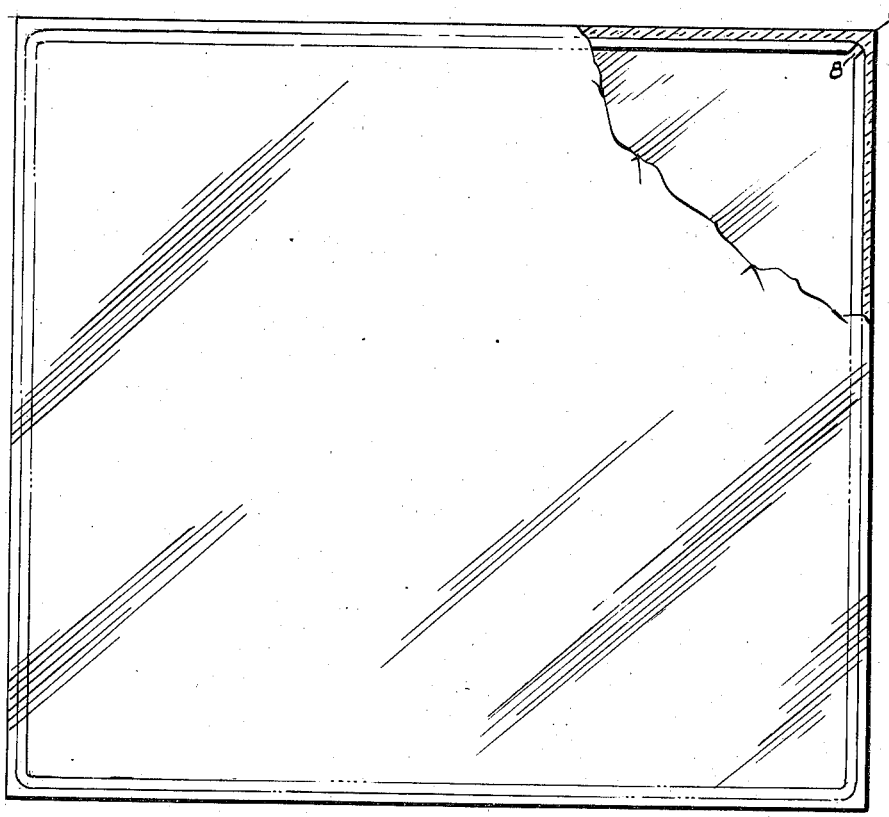
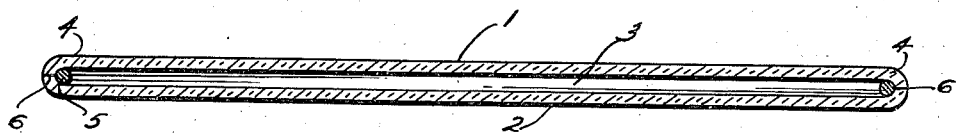
Inventor
Thomas S. Gerspacher
By Clarence A. O'Brien
and Harvey B. Jacobson
Attorneys Patented Apr. 16, 1946

2,398,371

UNITED STATES PATENT OFFICE 2,398,371

WINDOW GLASS

Thomas S. Gerspacher, Baldwin, N. Y.

Application January 26, 1944, Serial No. 519,792

1 Claim. (Cl. 20—56.5)

My invention relates to improvements in glass panels, or panes, for windows and the like, the principal object in view being to provide an inexpensive, practical, hollow glass panel, or pane, which will not collect moisture, is adapted to act as insulation against heat and cold, is substantially sound-proof and designed for use in the same manner as the usual pane of glass.

Other and subordinate objects are also comprehended by my invention, all of which, together with the precise nature of my improvements, will be readily understood when the succeeding description and claim are read with reference to the drawing accompanying and forming part of this specification.

In said drawing:

Figure 1 is a view in side elevation, partly in section, of a panel, or pane, constructed in accordance with my invention, Figure 2 is a view in transverse section.

Referring to the drawing by numerals, my improved hollow panel, or pane, comprises two thicknesses of glass 1, 2 spaced apart parallel, side by side, a slight distance, except at the edges of the panel, to provide therebetween a vacuum chamber 3, the edges of the panel being transversely rounded, as at 4, and reinforced by an internal wire frame 5 of suitable light, strong material extending around said edges and acting as a separator between the two thicknesses of glass.

In forming the described panel, a sheet of ordinary glass, and preferably rectangular in shape, is utilized to provide the thickness 1, and a similarly-shaped, but slightly smaller, former of a single strand of wire is placed upon the sheet and spaced equidistantly from the edges of the sheet. A second sheet of glass of the same size as the sheet first mentioned is then positioned on, or against, the former with its edges parallel with the edges of the first-mentioned sheet and to comprise the thickness 2. The edges of said sheets are then, under the action of heat, bent over the former and fused together at substantially the line 6. The air is then preferably exhausted, in any suitable manner, from the vacuum chamber 3.

My invention also comprehends introducing an inert gas, such as dehydrated nitrogen gas, in the chamber 3 under reduced, or atmospheric, pressure to reduce heat transfer between the sheets and thereby provide for insulation therebetween.

The air may be exhausted, or such gas introduced, through one corner, for instance 7, of the structure, through a gap 8 provided in the former, or frame 5 at said corner, by reheating the corner after it is fused and inserting the usual needle, not shown, in said corner, then permitting the corner to re-fuse after the needle is withdrawn. As an alternative procedure, the needle may be inserted while the two sheets are being fused together when such fusing is partially accomplished.

The advantages of a glass panel constructed as described will be understood without explanation.

Manifestly, the invention, as described, is susceptible of modification without departing from the inventive concept, and right is herein reserved to such modifications as fall within the scope of the appended claim.

What I claim is:

A hollow glass panel comprising two like sheets of glass opposed side by side in spaced-apart relation with edges rounded and fused together and forming a transversely concavo-convex marginal web connecting said sheets and sealing the space between the same, and an internal wire frame extending around said web internally of the panel and seating in said web, the space between said sheets forming a vacuum chamber.

THOMAS S. GERSPACHER.